June 27, 1933.  W. C. HEDGCOCK  1,916,142
TRUCK
Filed Sept. 8, 1931   5 Sheets-Sheet 2
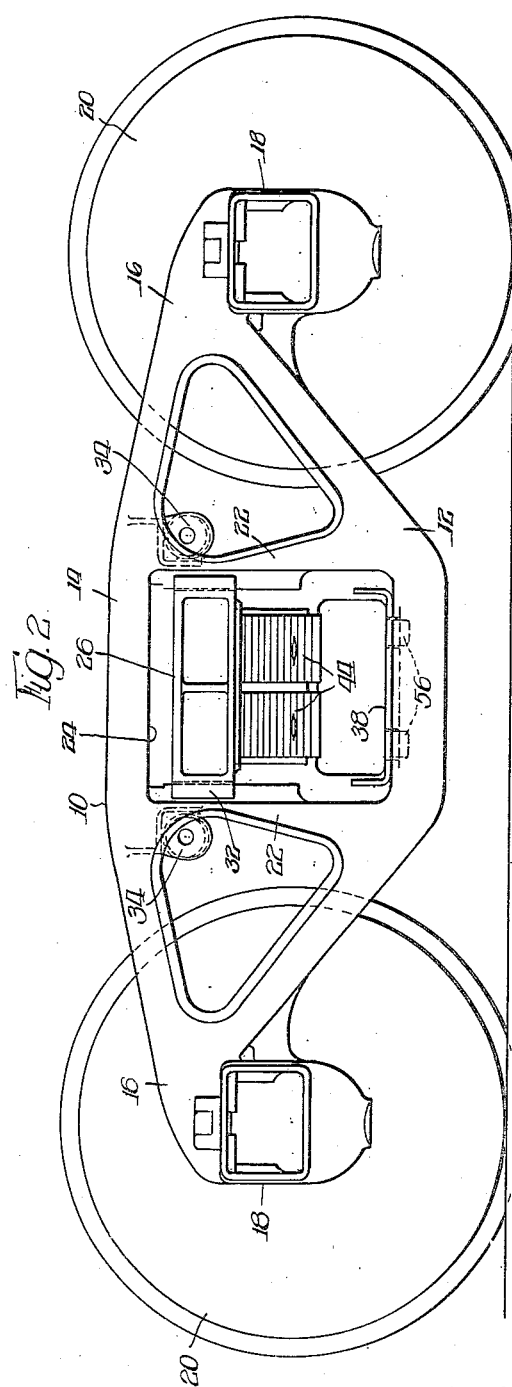
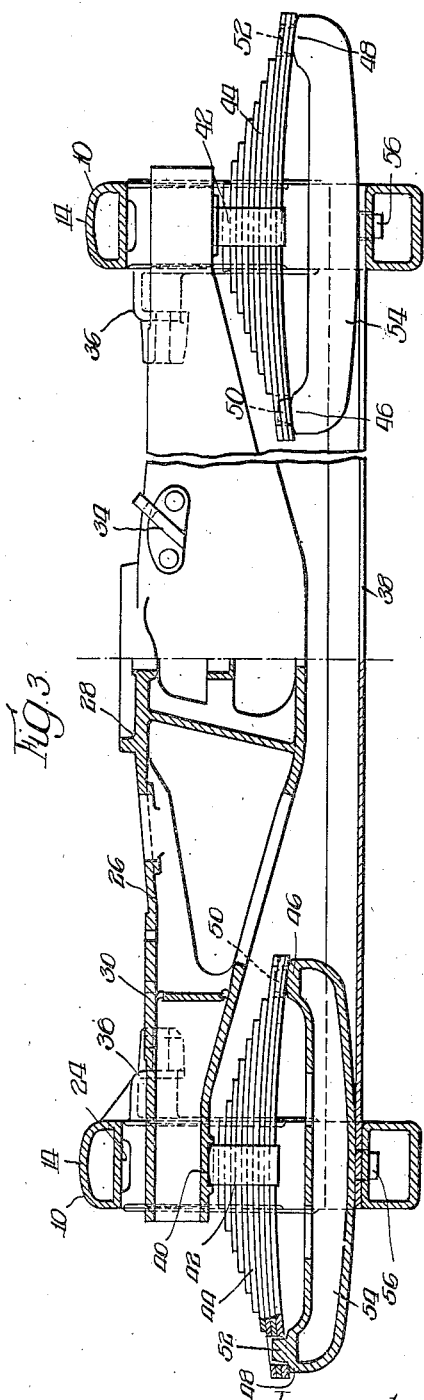
Inventor:
William C. Hedgcock,
By Atkinson, Ashby, Byrne & Knight
attys

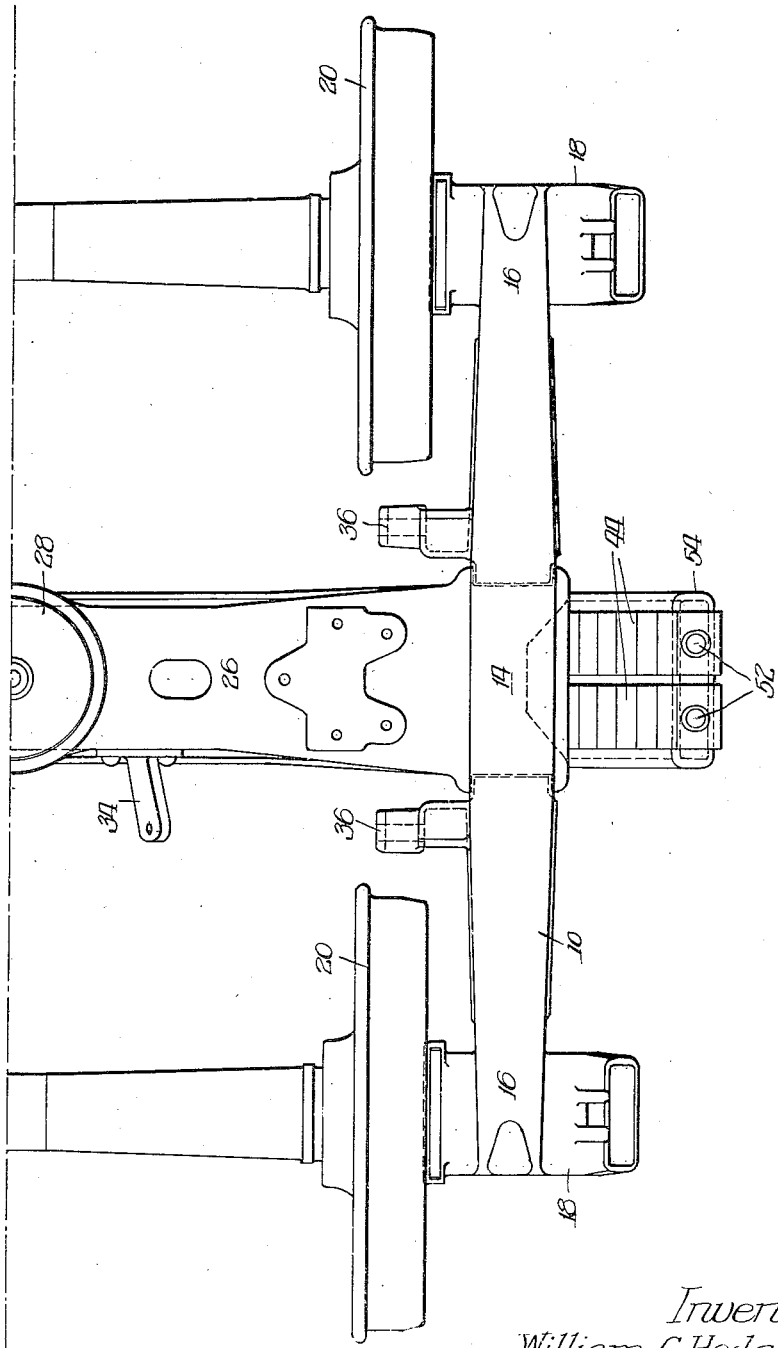

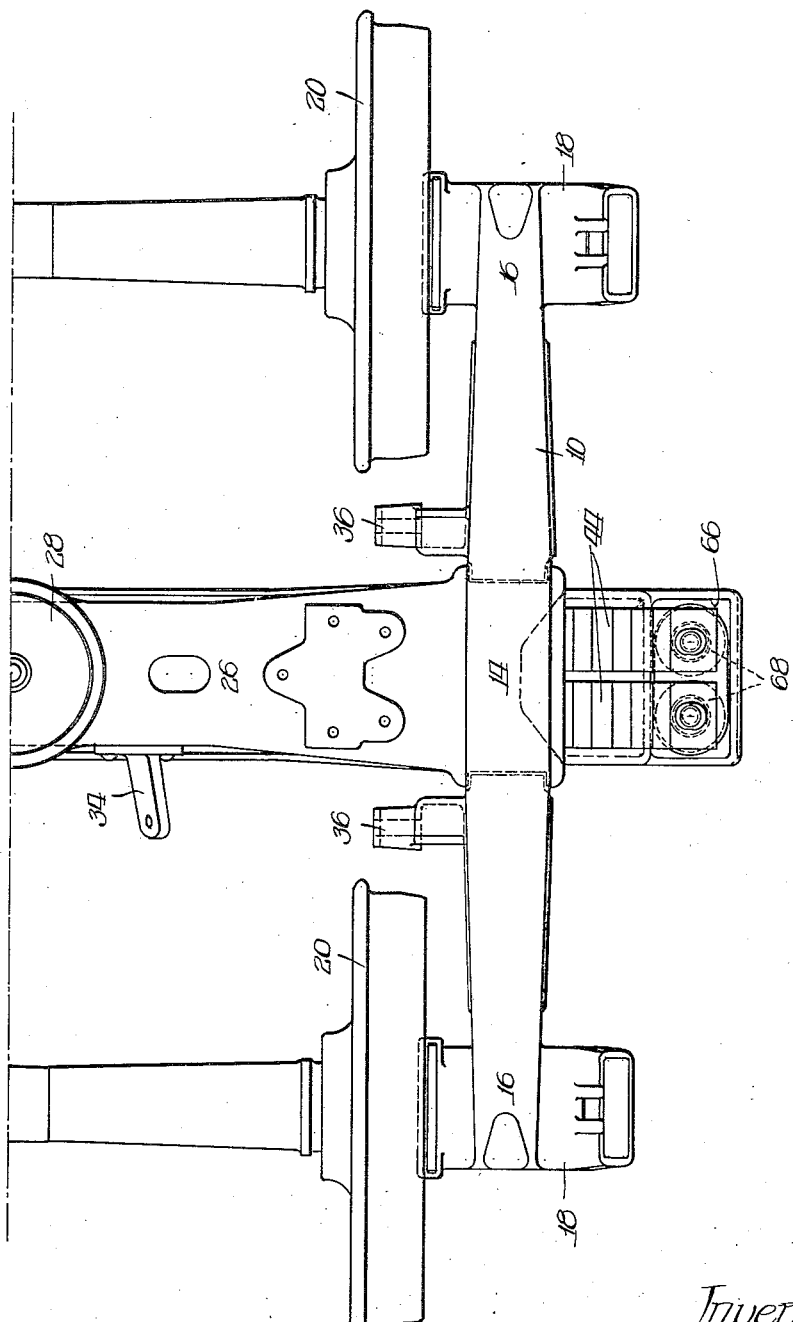

June 27, 1933.　　　W. C. HEDGCOCK　　　1,916,142
TRUCK
Filed Sept. 8, 1931　　　5 Sheets-Sheet 4
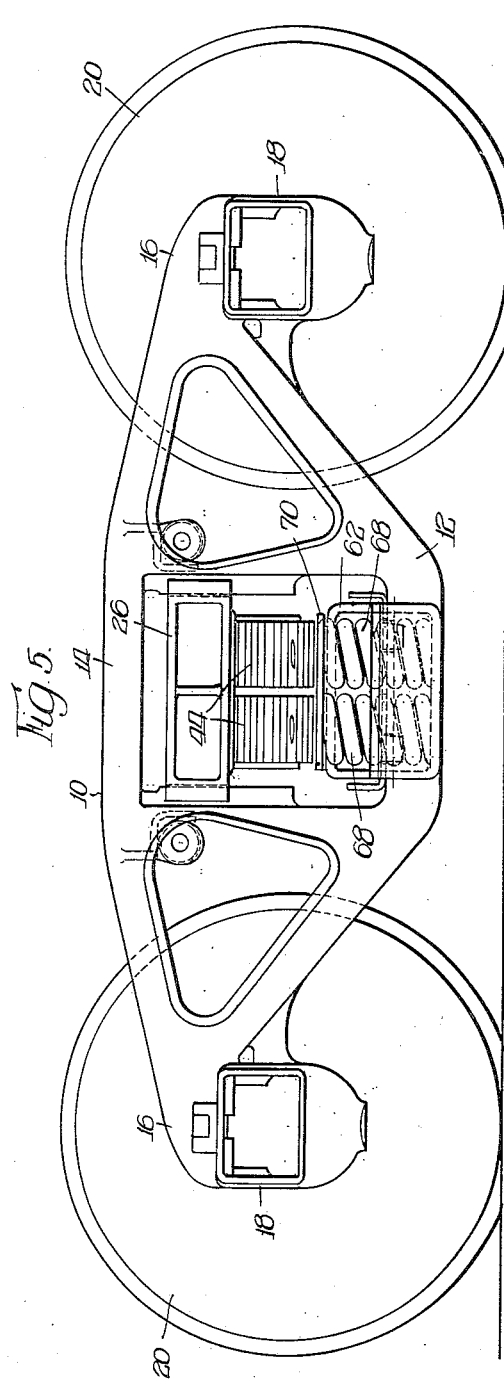
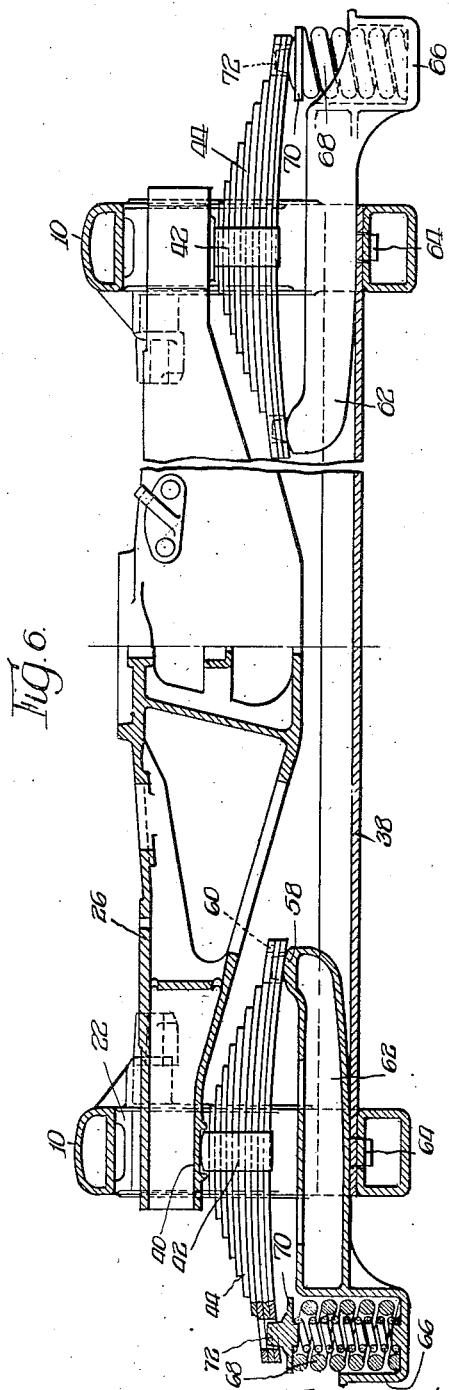
Inventor:
William C. Hedgcock,

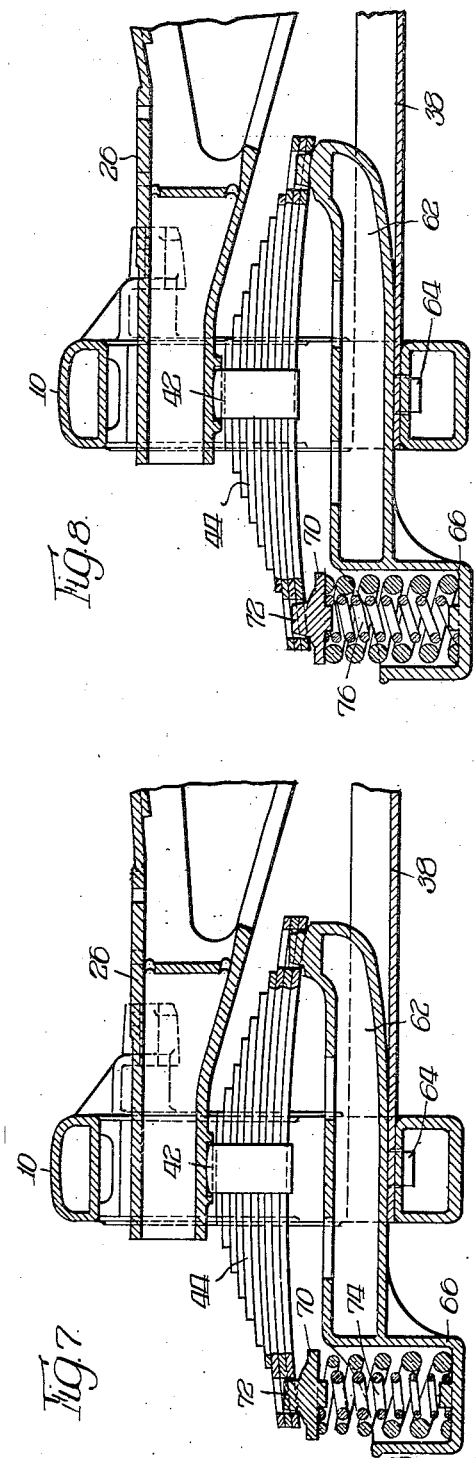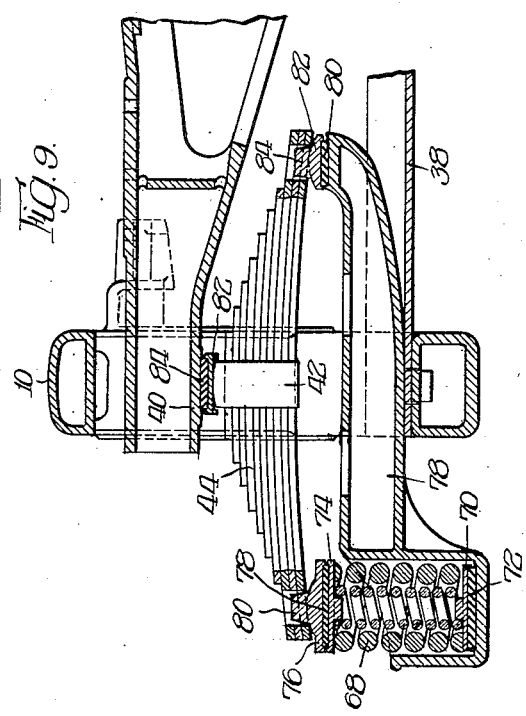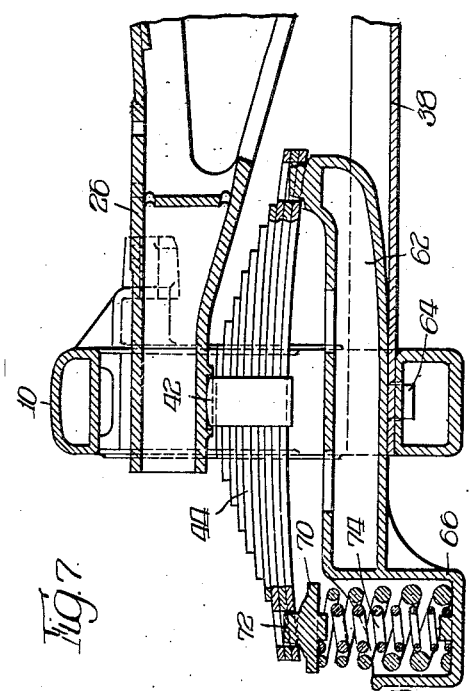

Patented June 27, 1933

1,916,142

UNITED STATES PATENT OFFICE

WILLIAM C. HEDGCOCK, OF WILMETTE, ILLINOIS, ASSIGNOR TO AMERICAN STEEL FOUNDRIES, OF CHICAGO, ILLINOIS, A CORPORATION OF NEW JERSEY

TRUCK

Application filed September 8, 1931. Serial No. 561,532.

This invention pertains to car trucks.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car; the resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity.

Passenger car trucks are generally easy riding, due to the use of both coil and elliptic leaf springs in series; the coil springs responding to the light, quick shocks, the leaf springs to the slow heavy impulses. Coil springs are quick and sensitive in response, leaf springs relatively less so, partly due to frictional work absorption between the leaves. For this reason, and also by providing coil and leaf springs of different natural vibration periods, they tend to dampen each other's synchronous vibration without impairing free spring response. This condition is obtained by having the different springs in series. Placing leaf and coil springs in parallel is not sufficient, since they then act as a unit and have a common period of vibration.

Although the usual passenger car truck with series arrangement of coil and leaf springs gives good riding qualities, it is undesirably heavy, costly and complicated for freight service. This is partly due to the complete duplication of carrying capacity in both coil and leaf springs.

It is, therefore, an object of this invention to provide a car truck which provides good riding qualities, and at the same time is economical to make and maintain, is simple and light in construction, and fulfills all requirements of manufacture and service.

Another object of the invention is to provide a car truck wherein the spring suspension is such that springs of different character are placed in series.

Yet another object of the invention is to provide a car truck having springs of different characteristics in series and so disposed that complete duplication of carrying capacity is not required in both types of springs.

A further object of the invention is to provide a car truck having springs of different character which are adapted to work independently of each other, whereby shocks incident to operation are adequately absorbed.

A still further object of the invention is to provide a car truck wherein the springs are arranged so that each dampens out the other's vibration.

A yet further object is to provide a truck construction wherein resilient pads are provided for dampening out metallic vibrations transmitted through the metallic truck parts, and also for the purpose of deadening noise.

Another further object is to provide a truck construction wherein resilient and friction and/or resilient means are disposed in series.

A different object is to provide spring assemblies wherein there is provided softer cushioning action under light loads, while at the same time providing the necessary stiffness and capacity under heavy loads, these features being combined also to provide a construction which reduces any tendency toward synchronous vibration of the springs.

An object of the invention is to provide a car truck wherein the spring suspension is such as to provide superior riding qualities to a coil spring suspension, yet can be utilized in a space wherein a full elliptic spring cannot be applied, the construction being such as to afford a saving in weight over the use of full elliptic springs.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a top plan view of substantially one-half of a truck construction embodying the invention;

Figure 2 is a side elevation of the truck construction shown in Figure 1;

Figure 3 is a transverse fragmentary sectional elevation of the truck construction shown in Figures 1 and 2;

Figure 4 is a top plan view of substantially one-half of a truck construction showing a modified form of truck embodying the invention;

Figure 5 is a side elevation of the truck construction shown in Figure 4;

Figure 6 is a transverse fragmentary sectional elevation of the truck construction shown in Figures 4 and 5;

Figures 7, 8 and 9 are fragmentary sectional elevations through modified forms of truck constructions.

In the truck constructions contemplated, the side frame 10 is of the truss construction including a tension member 12 and a compression member 14 merging adjacent the ends thereof at 16 and provided with the journal boxes 18, either separate or cast integral therewith. The journal boxes cooperate with the journal ends of any preferred type of wheel and axle assemblies 20. The tension and compression members are joined by means of the spaced column guides 22 formed integral therewith and providing a bolster opening 24. The bolster 26 is provided with the center bearing 28 and side bearings 30, and extends into the bolster opening, being provided with the spaced column guide cooperating members 32 permitting vertical sliding movement between the side frame and bolster. The bolster and side frame are provided with the brake hanger brackets 34 and 36 suitably disposed for carrying the brake rigging. The side frames are connected and maintained in squared position by means of the spring plank 38 disposed on the tension member between the columns 22 and being secured to said tension member.

In the construction illustrated in Figures 1 to 3 inclusive, the bolster is provided with the spring seat 40 adapted to receive the spring band 42 of the semi-elliptic spring assembly 44, the band preferably having locking cooperation therewith and supporting the bolster substantially on the longitudinal center line of the side frame. The inner and outer ends of the leaf spring assembly 44 are supported on suitable seats 46 and 48 and positioned by means of the dowels 50 and 52 provided on the equalizer member, load concentrating or transmitting member, or loading member 54. This equalizer member is rockably supported on each tension member between the spaced columns 22 and is centered by means of the depending dowel 56 extending through the spring plank and side frame.

With such construction economy of material is effected over an arrangement where transverse equalizers are provided or where a full elliptic spring is provided. This construction, moreover, is equivalent in riding qualities to a construction wherein a full elliptic spring is used and this arrangement can be applied to a truck where the vertical height provided for the spring suspension is limited, and where a full elliptic spring cannot be adapted. The equalizing member requires less than the corresponding half of a full elliptic spring and furthermore the deflection of the spring is cut in half by the use of the semi-elliptic spring instead of a full elliptic spring which also adapts this construction to a space of limited height.

In the construction shown in Figures 5 to 9, inclusive, the bolster 26 is provided with the spring seat 40 rockably cooperating with the spring band 42 of the semi-elliptic leaf spring assemblies 44. In these constructions, the inner end of the leaf spring assembly is supported on the spring seat 58 and positioned thereon by means of the dowel 60 provided on the equalizer or loading member 62. This equalizer member is rockably supported on the side frame and tension member between the column guides 22 and centered by means of the depending dowels 64 extending through the spring plank 38 and the side frame. The outer end of the equalizer or loading member 62 is provided with a spring pocket 66 which, in the construction shown in Figures 4 to 6 inclusive, is provided with a coil spring assembly 68, the spring being of constant section, stiffness and pitch. The coil spring is provided with the spring cap 70 which supports the outer end of the leaf spring assembly 44, the dowel 72 being provided for maintaining the proper relative positions between the leaf and coil springs.

In the construction shown in Figure 7, the coil spring assembly 74 includes a coil spring constructed from a bar of tapering diameter giving substantially the same effect in operation as a coil spring of variable pitch such as shown at 76 in Figure 8.

In the construction shown in Figure 9, the equalizer or loading member 78 is substantially the same as that described in Figures 4 to 6 inclusive, the inner end of the equalizer, however, being provided with the rubber or other resilient pad 80 between the equalizer and a seat member 82, the seat member 82 being provided with a dowel 84 having cooperation with the leaf spring assembly 44. In a similar manner, the coil spring assembly 68 is seated on the member 70 between which and the pocket 66 the rubber or other resilient pad 72 is provided, and the upper end of the coil spring is seated on the member 74 between which and the member 76 the rubber or other resilient pad 178 is provided, the member 76 being provided with the upstanding dowel 80 for supporting cooperation with the leaf spring assembly 84. The spring band 42 is seated on the member 82 between which and the bolster seat 40 a rubber or other resilient pad 84 is provided.

It will be appreciated that the leaf spring assembly furnishes a resilient friction support for the bolster, and when a coil spring assembly is used, one assembly serves to dampen the vibrations of the other, preventing synchronism of the periods of the springs while the equalizers serve to transmit equal stresses to the side frames. Also, any coil springs may be used, such as those of variable pitch, stiffness, etc., as shown in application Serial No. 552,152, filed July 21, 1931; and it is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a car truck, the combination of a side frame including a tension and compression member and spaced column guides integrally connecting said members and forming a bolster opening, a bolster extending into said opening and having guide cooperating members, a spring supporting said bolster and supported at a plurality of points on a rigid loading member rockably supported on said side frame.

2. In a car truck, the combination of a side frame including a tension and compression member and spaced column guides integrally connecting said members and forming a bolster opening, a bolster extending into said opening and having guide cooperating members, a leaf spring supporting said bolster and supported at a plurality of points on a rigid loading member rockably supported on said side frame.

3. In a car truck, the combination of a side frame including a tension and compression member and spaced column guides integrally connecting said members and forming a bolster opening, a bolster extending into said opening and having guide cooperating members, a leaf spring supporting said bolster and supported on a rigid loading member rockably supported on said side frame.

4. In a car truck, the combination of a side frame including a tension and compression member and spaced column guides integrally connecting said members and forming a bolster opening, a bolster extending into said opening and having guide cooperating members, a friction member supporting said bolster and supported at a plurality of points on a rigid loading member rockably supported on said side frame.

5. In a car truck, the combination of a side frame including a tension and compression member and spaced column guides integrally connecting said members and forming a bolster opening, a bolster extending into said opening and having guide cooperating members, a friction assembly supporting said bolster and supported on a rigid loading member at a plurality of points and rockably supported on said side frame.

6. In a car truck, the combination of a side frame including a tension and compression member and spaced column guides integrally connecting said members and forming a bolster opening, a bolster extending into said opening and having guide cooperating members, a resilient friction assembly supporting said bolster and supported on a rigid loading member at a plurality of points and rockably supported on said side frame.

7. In a car truck, the combination of a side frame member, a bolster, a spring supporting said bolster and supported at a plurality of points on a rigid loading member rockably supported on said side frame member above said side frame member.

8. In a car truck, the combination of a side frame, a bolster, a leaf spring supporting said bolster and supported at a plurality of points on a rigid loading member rockably supported on said side frame.

9. In a car truck, the combination of a side frame, a bolster, a leaf spring supporting said bolster and supported on a rigid loading member rockably supported on said side frame.

10. In a car truck, the combination of a side frame, a bolster, a friction member supporting said bolster and supported on a rigid loading member rockably supported on said side frame.

11. In a car truck, the combination of a side frame including a tension and compression member and spaced column guides integrally connecting said members and forming a bolster opening, a bolster extending into said opening and having guide cooperating members, a spring supporting said bolster and supported at a plurality of points on a rigid loading member rockably supported on said side frame, and resilient means between said spring and loading member.

12. In a car truck, the combination of a side frame including a tension and compression member and spaced column guides integrally connecting said members and forming a bolster opening, a bolster extending into said opening and having guide cooperating members, a spring supporting said bolster and supported at a plurality of points on a rigid loading member rockably supported on said side frame, and a coil spring between said spring and loading member.

13. In a car truck, the combination of a side frame, a bolster, a spring supporting said bolster and supported at a plurality of points on a rigid loading member rockably supported on said side frame, and a coil spring between said spring and loading member.

14. In a car truck, the combination of a side frame, a bolster, a spring supporting said bolster and supported at a plurality of points on a rigid loading member rockably supported on said side frame, and resilient means between said spring and loading member.

15. In a car truck, the combination of a side frame including a tension and compression member and spaced column guides integrally connecting said members and forming a bolster opening, a bolster extending into said opening and having guide cooperating members, a spring supporting said bolster and supported at a plurality of points on a rigid loading member rockably supported on said side frame, and a resilient pad, and resilient means between said spring and loading member.

16. In a car truck, the combination of a side frame including a tension and compression member and spaced column guides integrally connecting said members and forming a bolster opening, a bolster extending into said opening and having guide cooperating members, a spring supporting said bolster and supported at a plurality of points on a rigid loading member rockably supported on said side frame, and a coil spring of variable pitch between said spring and loading member.

17. In a car truck, the combination of a side frame including a tension and compression member and spaced column guides integrally connecting said members and forming a bolster opening, a bolster extending into said opening and having guide cooperating members, a spring supporting said bolster and supported at a plurality of points on a rigid loading member rockably supported on said side frame, and a tapered coil spring between said spring and loading member.

18. In a car truck, the combination of a side frame including a tension and compression member and spaced column guides integrally connecting said members and forming a bolster opening, a bolster extending into said opening and having guide cooperating members, a spring supporting said bolster and supported at a plurality of points on a rigid loading member rockably supported on said side frame, and a resilient pad between said spring and bolster.

19. In a car truck, the combination of a side frame including a tension and compression member and spaced column guides integrally connecting said members and forming a bolster opening, a bolster extending into said opening and having guide cooperating members, a spring supporting said bolster and supported at a plurality of points on a rigid loading member rockably supported on said side frame, and a coil spring between said spring and loading member and located outwardly of said side frame.

20. In a car truck, the combination of a side frame including a tension and compression member and spaced column guides integrally connecting said members and forming a bolster opening, a bolster extending into said opening and having guide cooperating members, a spring supporting said bolster and supported at a plurality of points on a rigid loading member rockably supported on said side frame, said loading member being provided with a pocket, and resilient means carried by said pocket and interposed between said loading member and spring.

21. In a car truck, the combination of a side frame, a bolster, a spring supporting said bolster and supported at a plurality of points on a rigid loading member rockably supported on said side frame, said loading member being provided with a pocket, and resilient means carried by said pocket and interposed between said loading member and spring.

22. In a car truck, the combination of a side frame, a bolster, a spring supporting said bolster and supported at a plurality of points on a rigid loading member rockably supported on said side frame, said loading member being provided with a pocket, and a coil spring carried by said pocket and interposed between said loading member and spring.

23. In a car truck, the combination of a side frame, a bolster, a spring supporting said bolster and supported at a plurality of points on a rigid loading member rockably supported on said side frame, said loading member being provided with a pocket, and resilient means carried by said pocket and interposed between said loading member and spring, said pocket being disposed outwardly of said side frame.

24. In a car truck, the combination of a side frame, a bolster, a spring supporting said bolster and supported at a plurality of points on a rigid loading member rockably supported on said side frame, said loading member being provided with a pocket, and a coil spring carried by said pocket and interposed between said loading member and spring, said pocket being disposed outwardly of said side frame.

25. In a truck the combination of a side frame, a bolster, a spring supporting said bolster on said side frame through a loading member at a plurality of points thereon, said loading member being rockably supported on said side frame.

26. In a truck the combination of a side frame, a bolster, a spring supporting said bolster on said side frame through a loading member at a plurality of points thereon, said loading member being rockably supported on said side frame and below said loading member.

Signed at Chicago, Illinois, this 25th day of August. 1931.

WILLIAM C. HEDGCOCK.